(12) United States Patent
Floyd et al.

(10) Patent No.: US 7,397,617 B2
(45) Date of Patent: Jul. 8, 2008

(54) COLLIMATED OPTICAL SYSTEM

(75) Inventors: Michael R. Floyd, Salem, VA (US); Steven A. Brillhart, Vinton, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 85 days.

(21) Appl. No.: 11/268,784

(22) Filed: Nov. 8, 2005

(65) Prior Publication Data

US 2007/0103796 A1 May 10, 2007

(51) Int. Cl.
G02B 7/02 (2006.01)

(52) U.S. Cl. ........................... 359/811; 359/819

(58) Field of Classification Search .......... 359/811–823
See application file for complete search history.

(56) References Cited

U.S. PATENT DOCUMENTS

| | | | |
|---|---|---|---|
| 2,424,011 A | 7/1947 | DeGramont | 359/249 |
| 2,861,484 A | 11/1958 | Rance | 408/115 R |
| 3,713,725 A | 1/1973 | Uesugi | 359/813 |
| 3,737,667 A | 6/1973 | Babb et al. | 250/214 LIA |
| 4,669,833 A | 6/1987 | Mise | 359/420 |
| 4,723,075 A | 2/1988 | German | 250/231.14 |
| 4,743,763 A | 5/1988 | Cutburth et al. | 250/239 |
| 5,223,974 A | 6/1993 | Phillips et al. | 359/641 |
| 5,604,630 A | 2/1997 | Palmer | 359/409 |
| 6,259,088 B1 | 7/2001 | Antesberger | 250/214 VT |
| 6,337,768 B1 | 1/2002 | Carmi et al. | 359/399 |
| 6,339,500 B1 | 1/2002 | Carmi et al. | 359/399 |
| 6,411,448 B2 * | 6/2002 | Takanashi et al. | 359/822 |
| 6,456,497 B1 | 9/2002 | Palmer | 361/752 |
| 6,687,053 B1 | 2/2004 | Holmes et al. | 359/411 |
| 6,717,754 B2 * | 4/2004 | Hirunuma et al. | 359/819 |
| 2005/0128576 A1 | 6/2005 | Perger et al. | 359/412 |

OTHER PUBLICATIONS

International Search Report Appln. No. PCT/US2006/043373 dated Mar. 29, 2007.

* cited by examiner

*Primary Examiner*—M. Hasan
(74) *Attorney, Agent, or Firm*—RatnerPrestia (57) ABSTRACT

An optical system provides a lens cell having a generally cylindrical lens cell body and an optical lens system therein. The lens cell body has a lens cell central longitudinal axis and a lens cell optical axis, eccentrically offset from the lens cell central longitudinal axis. A sleeve has a generally cylindrical sleeve body, an outer surface with a first longitudinal axis, and an inner surface with a second longitudinal axis, eccentrically offset from the first longitudinal axis. The lens cell is inserted into the sleeve. A housing has a generally cylindrical body into which the sleeve is at least partially inserted. The lens cell and the sleeve are rotated relative to each other and to the housing such that the lens cell optical axis is aligned in a desired location. After the lens cell optical axis is aligned in the desired location, the lens cell is fixedly connected to the sleeve and the sleeve is connected to the housing to prevent rotation of the sleeve relative to the housing.

11 Claims, 6 Drawing Sheets

COLLIMATED OPTICAL SYSTEM

BACKGROUND OF THE INVENTION

In a vision-assisting device, such as a monocular, the device is collimated when the output optical axis matches the input optical axis such that the beam of light entering the device is parallel with the beam of light exiting the device. Typical assembly procedures produce a device that is not collimated due to inconsistencies in the mounting of various optical elements within the device. A night vision device normally deviates from a collimated system due to the offset caused by the microchannel plate and twisted fiber optic within the device.

When the device is not collimated, the image produced by the system is slightly out of alignment with the input image. Such slight misalignment is typically not a problem for a monocular. However, a binocular constructed from two uncollimated monoculars results in a user's eyes needing to independently point in different directions. This is a very unnatural condition, and often causes the user to experience eyestrain and headaches.

The F5050 night vision goggle collimates one monocular to the other through the use of a mechanism that includes a single eccentric mechanical housing. The single eccentric housing allows shifting of the optical image to approximate a collimated image. However, the F5050 goggles must be aligned as a system. Neither output optical axis is necessarily aligned with the mechanical axis of the binocular, or the input optical axes. If one of the monoculars is replaced or serviced, then both monoculars again need to be collimated to make the output axes parallel.

It would be beneficial to provide a collimated binocular in which a monocular can be replaced or serviced without having to re-collimate both monoculars in the binocular.

SUMMARY OF THE INVENTION

Briefly, the present invention provides an optical system comprising a lens cell having a generally cylindrical lens cell body and an optical lens system therein. The lens cell body has a lens cell central longitudinal axis and a lens cell optical axis, eccentrically offset from the lens cell central longitudinal axis. A sleeve has a generally cylindrical sleeve body, an outer surface with a first longitudinal axis, and an inner surface with a second longitudinal axis, eccentrically offset from the first longitudinal axis. The lens cell is inserted into the sleeve. A housing has a generally cylindrical body into which the sleeve is at least partially inserted. The lens cell and the sleeve are rotated relative to each other and to the housing such that the lens cell optical axis is aligned in a desired location. After the lens cell optical axis is aligned in the desired location, the lens cell is fixedly connected to the sleeve and the sleeve is connected to the housing to prevent rotation of the sleeve relative to the housing.

Additionally, the present invention further provides a binocular comprising a frame, a first monocular including the optical system as described above, and a second monocular having the same configuration as the first monocular. The first and second monoculars are separately releasably connected to the frame.

Also, the present invention provides a method of manufacturing a collimated optical device comprising the steps of providing the elements of the optical system as described above; inserting the lens cell into the sleeve; inserting the sleeve at least partially into a housing, wherein the housing comprises a generally cylindrical housing body; independently rotating the sleeve and the lens cell relative to each other and to the housing until the optical device is at a desired collimation; securing the sleeve and the lens cell to each other to prevent rotation of the sleeve relative to the lens cell; and securing the sleeve to the housing to prevent rotation of the sleeve relative to the housing.

BRIEF DESCRIPTION OF THE DRAWINGS

The foregoing summary, as well as the following detailed description preferred embodiments of the invention, will be better understood when read in conjunction with the appended drawings, which are incorporated herein and constitute part of this specification. For the purposes of illustrating the invention, there are shown in the drawings embodiments that are presently preferred. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Certain terminology is used herein for convenience only and is not to be taken as a limitation on the present invention. The terminology includes the words specifically mentioned, derivatives thereof and words of similar import. As used herein, the term "input" is defined to mean a direction farther from a user when the monocular is in a use position as described herein and "output" is defined to mean a direction closer to the user when the monocular is in a use position as described herein. The following describes a preferred embodiment of the invention. However, it should be understood based on this disclosure, that the invention is not limited by the preferred embodiment of the invention.

Figure 1:
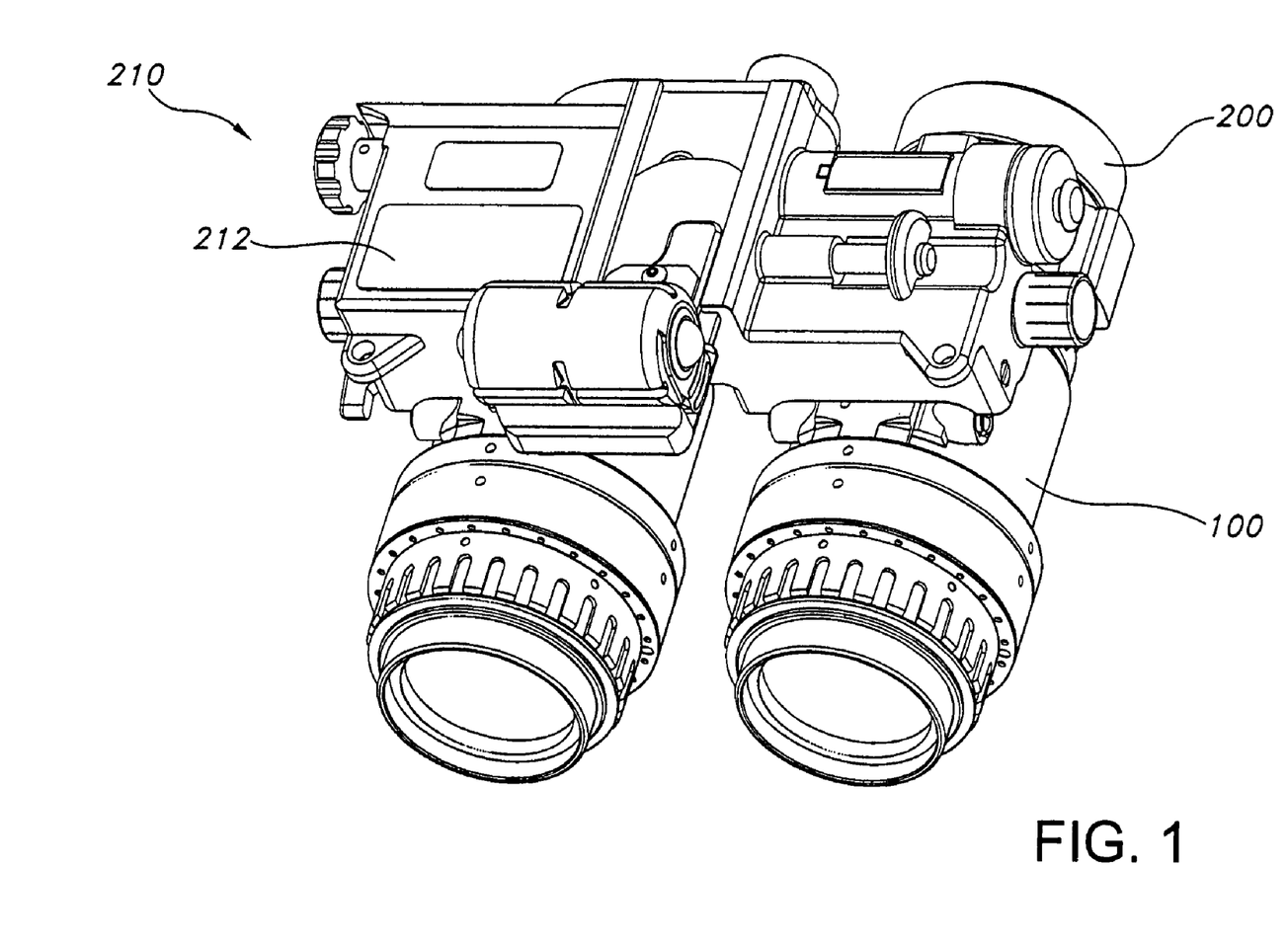
FIG. 1 is a perspective view of a binocular including a monocular according to an embodiment of the present invention.

Referring to the drawings generally, a monocular 100 according to a preferred embodiment of the present invention is shown. The preferred monocular 100 can be used as a monocular or can be part of a night vision goggle (NVG) binocular 210, shown in FIG. 1. These devices are used to intensify ambient or infrared light for enhanced visibility in a darkened environment.

Figure 2:
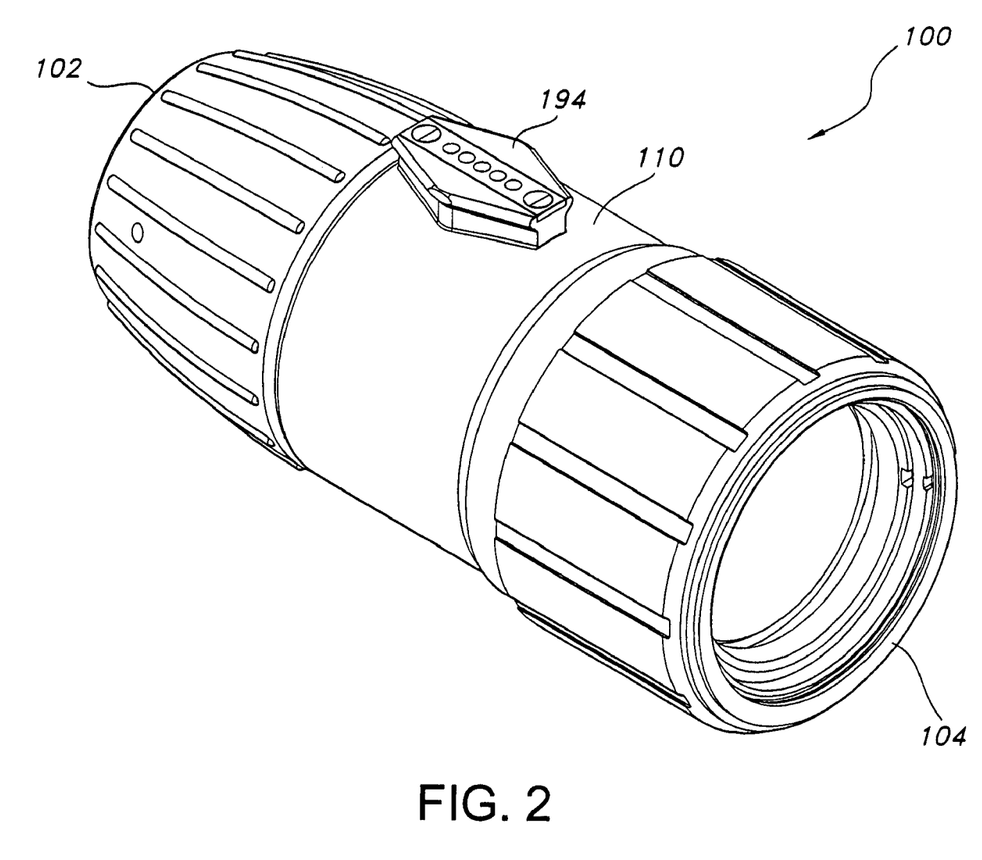
FIG. 2 is a perspective view of the monocular only according to an embodiment of the present invention.
Figure 3:
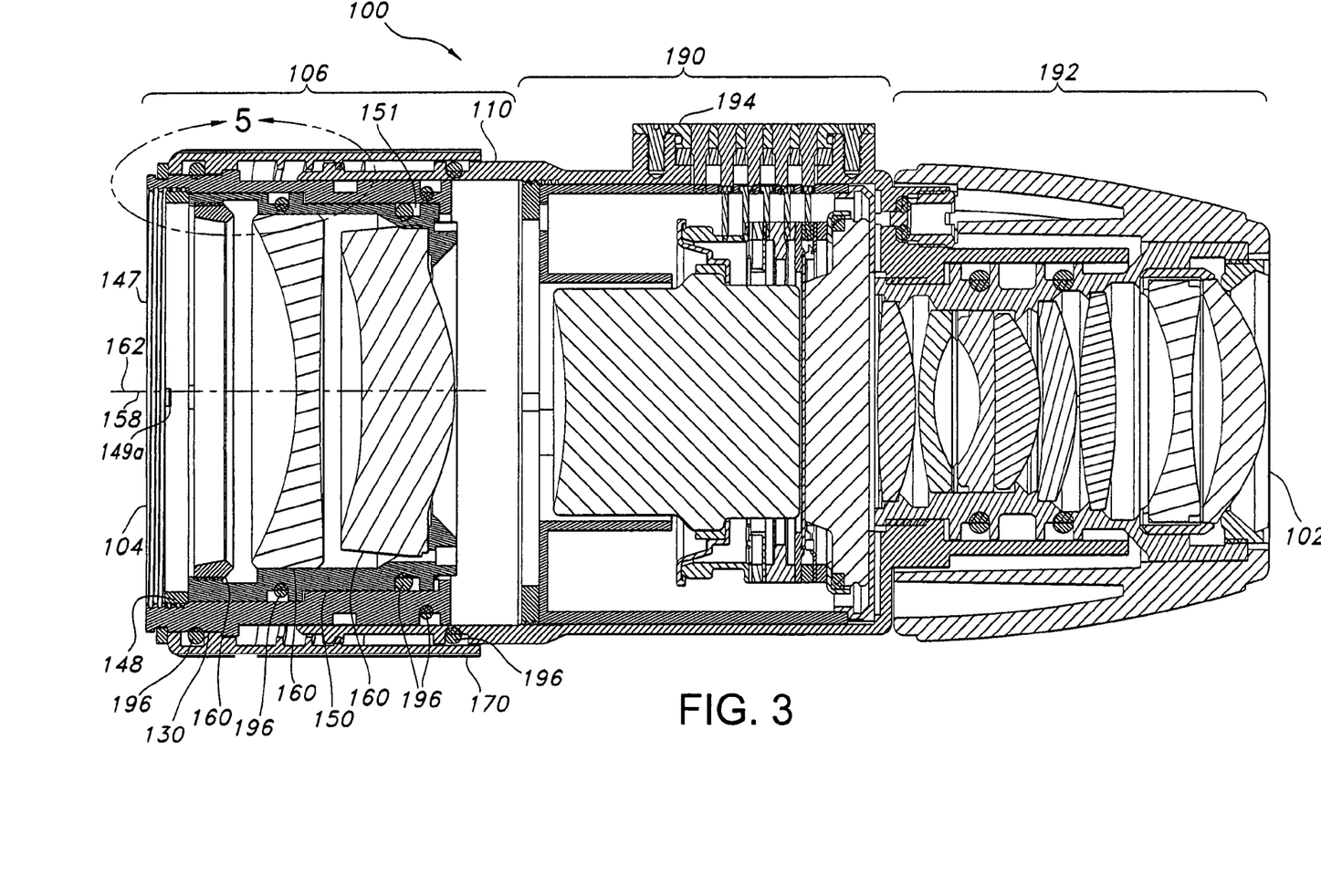
FIG. 3 is a longitudinal side view, in section, of the monocular shown in FIG. 1.

Referring to FIG. 2, the monocular 100 is generally tubularly shaped, with an input end 102, which receives light from the external environment, and an output end 104, which transmits the intensified image to a user. Referring to FIG. 3, which is a longitudinal section view of the monocular 100, the major components of the monocular 100 are, from left to right, an eyepiece 106, an image intensifier tube 190 and an objective objective lens assembly 192, which are all carried in a housing 110.

Figure 4:
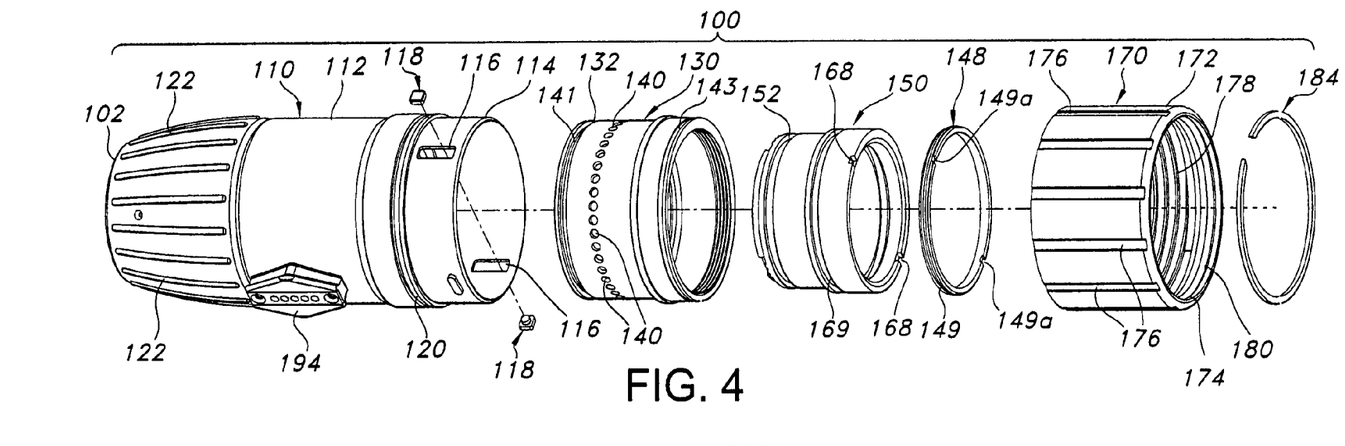
FIG. 4 is an exploded view of eyepiece components of the monocular shown in FIG. 1.
Figure 5:
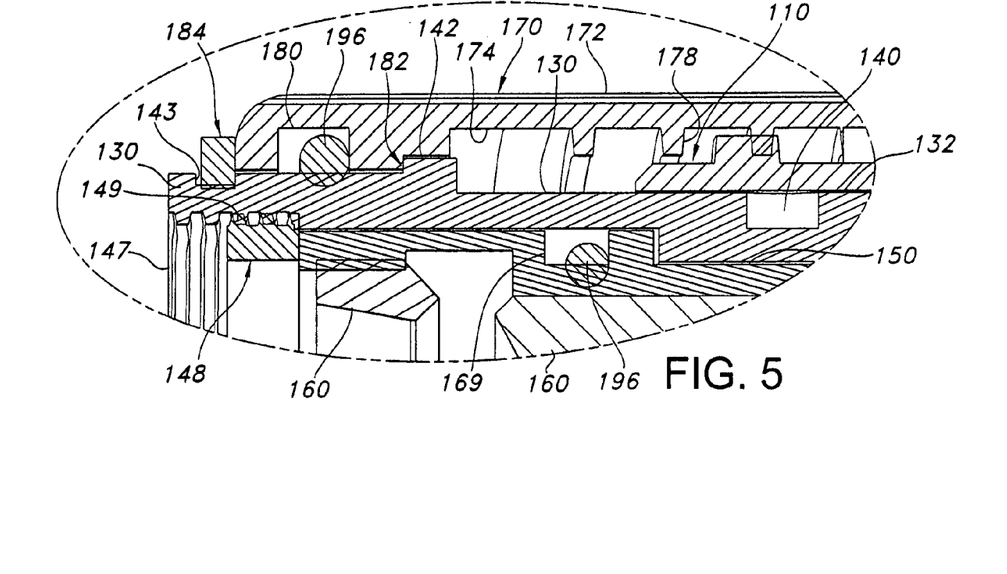
FIG. 5 is an enlarged view of a portion of the eyepiece portion shown in FIG. 3.

Referring to FIGS. 3-5, the eyepiece 106 includes a lens cell 150 disposed within the sleeve 130, which is partially disposed within the housing 110. A focus ring 170 threadably engages the housing 110 and is operative to longitudinally translate the sleeve 130 and the lens cell 150 with respect to the housing 110. Such translation is preferably accomplished without rotating the sleeve 130 and the lens cell 150 with respect to the housing 110. The eyepiece 106 is collimated during fabrication. Therefore, it is desired that the sleeve 130 and the lens cell 150 do not rotate relative to the housing 110 or each other during operation, such as during focusing of the eyepiece 106 by the user.

The housing 110 is in the form of a generally tubular body 112. An output end 114 of the housing 110 include two diametrically spaced elongated slots 116 formed in the body 112. The slots 116 are sized to allow a shoulder pin 118, shown in FIG. 6, to be inserted therethrough to engage the eccentric sleeve 130, as will be described later in detail herein. The shoulder pin 118 includes a preferably square head 118a that fits into the slot 116 and a cylindrical shank 118b extending therefrom and into the sleeve 130. Preferably, the head 118a does not extend beyond the exterior of the body 112 in the area of the shoulder pin 118. While the shoulder pin 118 is preferred, those skilled in the art will recognize that a set screw or other known securing device may be used instead of the shoulder pin 118.

Referring back to FIGS. 3-5, the housing 110 also includes a thread 120 formed on the outer surface of the body 112 to threadably engage the focus ring 170. At the input end 102, the housing 110 includes a plurality of circumferentially spaced ridges 122 that extend generally parallel to each other and longitudinally along the length of the input end 102. The ridges 122 assist the user in gripping the monocular 100 during use.

Figure 7:
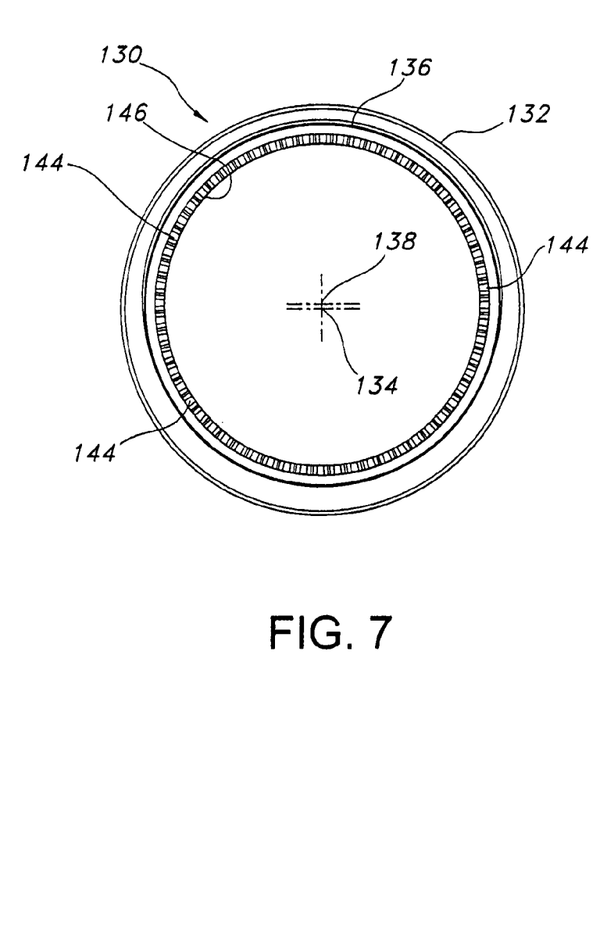
FIG. 7 is a profile view from an output end of the sleeve shown in FIG. 4.

The eccentric sleeve 130 includes a generally cylindrical body defined by an outer surface 132 having an outer cylinder axis 134 that extends perpendicularly out of the plane of the page of FIG. 7, and an inner surface 136 that is eccentrically offset from the outer surface 132. The inner surface 136 has an inner cylinder axis 138 that extends perpendicularly out of the plane of the page of FIG. 7. The inner cylinder axis 138 is slightly offset from the outer cylinder axis 134 by a slight distance, preferably approximately 0.5 millimeters, although those skilled in the art will recognize that the offset distance may be more or less than 0.5 millimeters. This offset creates a first eccentricity in the sleeve 130 such that, when the sleeve 130 is inserted into the housing 110 and rotated within the housing 110 during fabrication, the inner cylinder axis 138 shifts relative to the outer cylinder axis 134.

Figure 6:
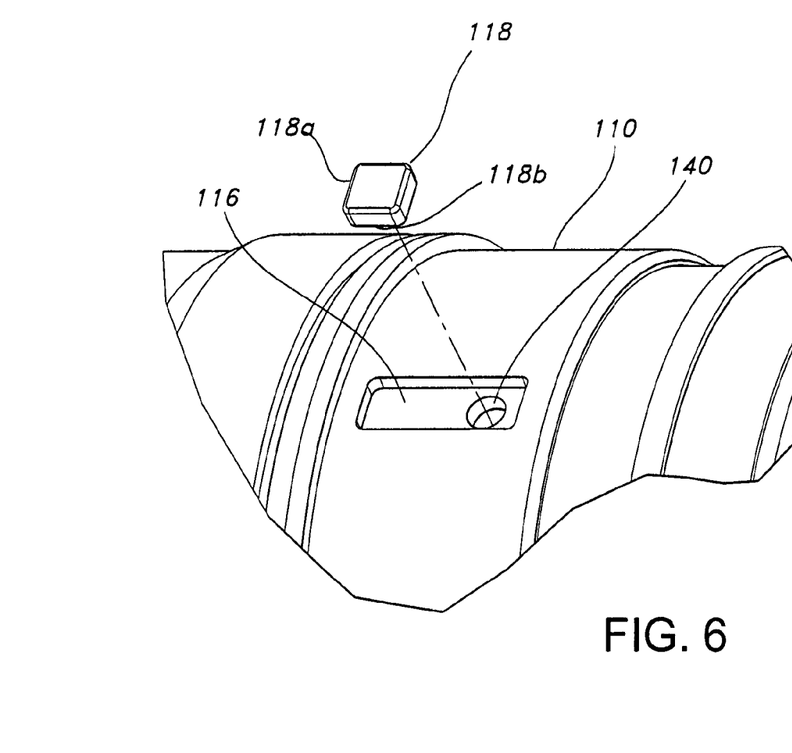
FIG. 6 is a perspective view of a connection between a housing and sleeve of the eyepiece shown in FIG. 4.
Figure 8:
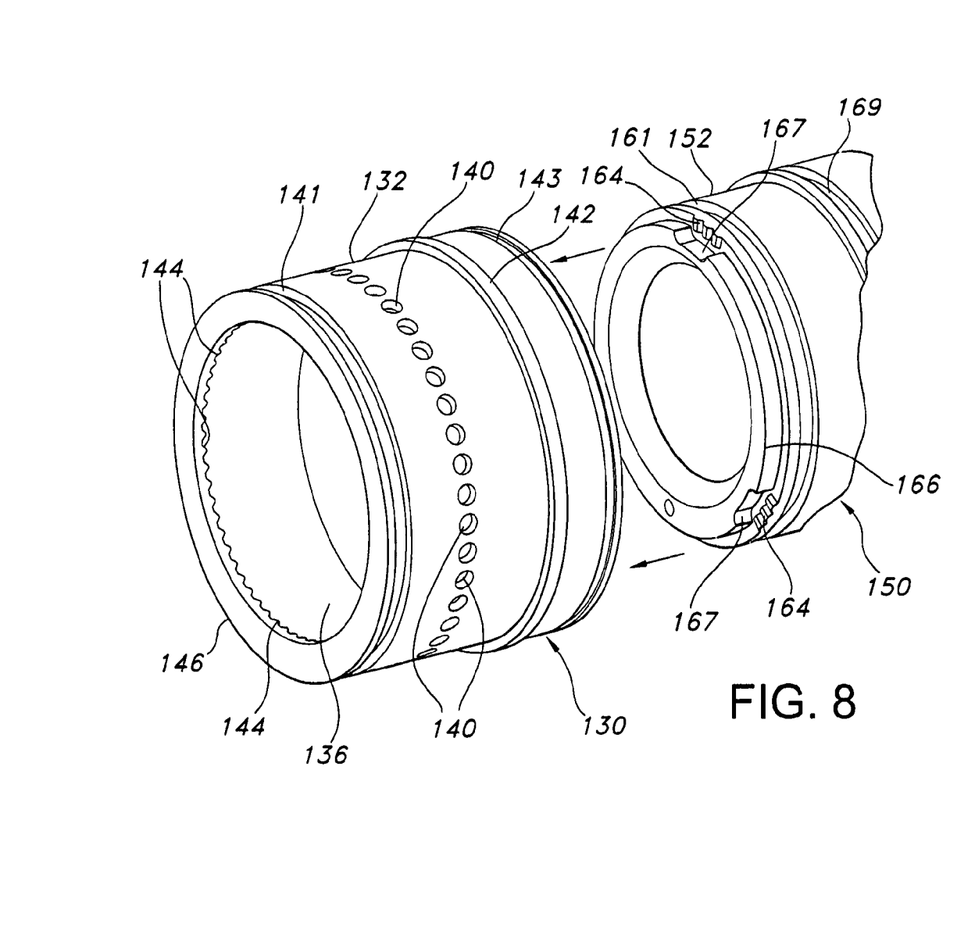
FIG. 8 is a perspective view of a lens cell being inserted into the sleeve.

Referring to FIG. 8, the sleeve 130 also includes a series of recesses 140 that are circumferentially spaced about the outer surface 132. In the preferred embodiment, 40 recesses 140 extend, evenly spaced, around the outer surface 132. The recesses 140 may, but not necessarily, extend through the outer surface 132 to the inner surface 136. The recesses 140 are sized to accept and retain the cylindrical shank 118b with a snug fit. As shown in FIG. 6, when the sleeve 130 is inserted into the housing 110, the sleeve 130 is aligned with the housing 110 such that a selected one of the recesses 140 is aligned with the elongated slot 116. The shoulder pin 118 is insertable through the elongated slot 116 so that the cylindrical shank 118b is inserted into the selected recess 140 and the head 118a is seated in the elongated slot 116. The shoulder pin 118 prevents the sleeve 130 from rotating relative to the housing 110, but the elongated slot 116 allows the shoulder pin 118 and the sleeve 130 to translate longitudinally relative to the housing 110.

Referring back to FIG. 8, the outer surface 132 includes a groove 141 that extends circumferentially around an output end of the sleeve 130. The groove 141 is sized to accept and retain an o-ring to seal a joint between the outer surface 132 and the housing 110 during assembly of the monocular 100. The outer surface 132 also includes a lip 142 that extends radially outwardly away from the outer surface 132 between the groove 141 and the recesses 140. The lip 142 engages the focus ring 170 such that rotation of the focus ring 170 longitudinally translates the sleeve 130 relative to the housing 110.

The outer surface 132 further includes a groove 143 that extends circumferentially around an input end of the sleeve 130. The groove 143 is sized to accept and retain a snap ring inserted therein. The snap ring secures the focus ring 170 against the lip 142, as can be seen in FIG. 5.

Referring back to FIG. 8, the inner surface 136 also includes a plurality of teeth 144 that extend radially around an input lip 146 that extends inwardly from the inner surface 136 toward the inner cylinder axis 138. The plurality of teeth 144 engage a plurality of mating teeth on the lens cell 150, as will be described in detail later herein.

Referring to FIG. 5, the inner surface 136 also includes an internal thread 147 that receives a locking ring 148. The locking ring 148 biases the lens cell 150 against the sleeve 130 and transmits longitudinal motion of the sleeve 130 to the lens cell 150 during focusing. The locking ring 148 includes an external thread 149 that engages the internal thread 147 of the inner surface 136. The output end of the locking ring 148 also includes a pair of diametrically opposed slots 149a, shown in FIG. 4, that are used to insert the locking ring 148 into the sleeve 130. An insertion tool (not shown) engages the slots 149a. The insertion tool is rotated, thus rotating the locking ring 148 and threading the locking ring 148 onto the sleeve 130.

Figure 9:
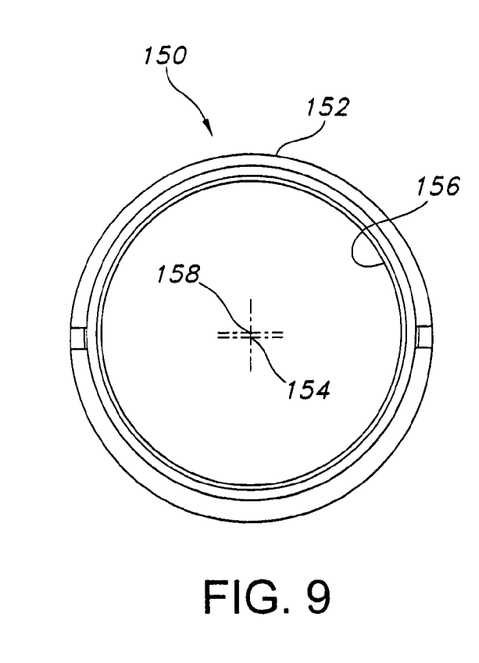
FIG. 9 is a profile view from an output end of the lens cell.

The lens cell 150 includes a generally cylindrical body defined by an outer surface 152 having an outer cylinder axis 154 that extends perpendicularly out of the plane of the page of FIG. 9, and an inner surface 156 that is eccentrically offset from the outer surface 152. The inner surface 156 has an optical axis 158 that extends perpendicularly out of the plane of the page of FIG. 9. The optical axis 158 is slightly offset from the outer cylinder axis 154 by a slight distance, preferably approximately 0.5 millimeters, although those skilled in the art will recognize that the offset distance may be more or less than 0.5 millimeters. This offset creates a second eccentricity in the lens cell 150 such that, when the lens cell 150 is inserted into the sleeve 130 and rotated within the sleeve 130 during fabrication, the optical axis 158 shifts relative to the outer cylinder axis 154.

Referring back to FIG. 3, the lens cell 150 includes a plurality of lenses 160 disposed within the inner surface 156. The lenses 160 include central axes 162 that are all aligned with the optical axis 158. Combined with the first eccentricity in the sleeve 130, the optical axis 158 can be manipulated about the outer cylinder axes 134, 154 until the optical axis 158 is collimated with the rest of the monocular 100.

Referring now to FIG. 8, the outer surface 152 includes a groove 161 that extends circumferentially around an input end of the lens cell 150. The groove 161 is sized to accept and retain an o-ring to seal a joint between the outer surface 152 and the sleeve 130 during assembly of the monocular 100. A portion of the input end of the lens cell 150 also includes a plurality of mating teeth 164 that engage the teeth 144 on the sleeve 130. The teeth 164 are preferably arranged in three sets that are circumferentially arranged around the input end of the lens cell 150. However, those skilled in the art will recognize that more or less than three sets of teeth 164 may be spaced around the input end of the lens cell 150. A lip 166 extends longitudinally away from the input end. The lip 166 includes a plurality of cutouts 167, with each cutout 167 spaced adjacent a set of the teeth 164. The cutouts 167 are formed to assist in cutting the teeth 164 during manufacture.

Referring back to FIG. 4, the output end of the lens cell 150 also includes a pair of diametrically opposed slots 168 formed therein. The slots 168 are sized to accept an insertion tool (not shown) to assist in inserting the lens cell 150 into the sleeve 130 during assembly. A groove 169 is formed in the outer surface 152 between the groove 161 and the teeth 164. The groove 169 is sized to accept and retain an o-ring to seal a joint between the outer surface 152 and the sleeve 130 during assembly of the monocular 100.

The focus ring 170 includes a generally annular body defined by an outer surface 172 and an inner surface 174. The outer surface 172 includes a plurality of circumferentially spaced longitudinal grooves 176. The grooves 176 enable a user to grip the focus ring 170 and rotate the focus ring 170 to focus the eyepiece 106 during use.

The inner surface 174 includes a threaded formation 178 that engages the external thread 120 on the housing 110. The inner surface 174 also includes a groove 180 that is sized to accept and retain an o-ring to seal a joint between the inner surface 174 and the sleeve 130. Additionally, referring to FIG. 5, the inner surface 174 includes a lip 182 that extends toward the sleeve 130 and engages the lip 142 of the sleeve 130.

A snap ring 184 is used to secure the focus ring 170 against the sleeve 130. The snap ring 184 snaps into the groove 143 in the sleeve 130 and secures the lip 182 of the focus ring 170 against the lip 143 of the sleeve 130.

Referring back to FIG. 3, the image intensifier 190 is located within the housing 110 and includes all of the optics, electronics and associated devices to operate the image intensifier 190. The objective lens assembly 192 is located within the housing 110, between the image intensifier 190 and the input end 102. The image intensifier 190 and the objective lens assembly 192 can be any known apparatus and need not be described in detail. However, while FIG. 3 shows multiple lenses comprising the objective lens assembly 192, those skilled in the art will recognize that the objective lens assembly 192 may include a single lens only. A power connector 194 extends outwardly from the housing body 112. The power connector 194 electrically connects the image intensifier 190 to a power source (not shown). The power connector 194 also releasably physically connects the monocular 100 to a support, such as for binoculars or a weapon sight.

A plurality of O-rings 196 are used in the monocular 100 to seal engagement surfaces of several of the above-referenced components to keep moisture and dirt from entering the internal structure of the monocular 100.

To assemble the eyepiece 106, the image intensifier 190 and the objective lens assembly 192 are inserted into the monocular 100 according to known methods. The lens cell 150 is partially inserted into the sleeve 130 as shown in FIG. 8 so that the mating teeth 164 of the lens cell 150 engage the teeth 144 of the sleeve 130. The combined sleeve 130 and lens cell 150 are then inserted into the housing 110. The sleeve 130 and the lens cell 150 are independently rotated relative to each other and to the housing 110 in order to collimate the monocular 100. The eccentricity of the optical axis 158 with respect to the outer cylinder axis 154 of the lens cell 150, as well as the eccentricity of the outer cylinder axis 134 relative to the inner cylinder axis 138 of the sleeve 130, allows the sleeve 130 and the lens cell 150 to be rotated relative to the housing 110 until the optical axis 158 is collimated with the image intensifier 190 and the objective lens assembly 192. The teeth 144 and the mating teeth 164 are ramped to allow indexing during collimation. In the event that the teeth 164, 144 do not perfectly align to retain perfect collimation, the lens cell 150 may be indexed relative to the sleeve 130 to obtain a mating engagement between the teeth 164, 144, while only slightly distorting the collimation of the eyepiece 106.

Next, the sleeve 130 is aligned with the housing 110 such that a selected recess 140 is aligned with each elongated slot 116. When a recess 140 is aligned with one of the slots 116, another recess 140 will be aligned with the remaining slot 116. A shoulder pin 118 is inserted through each slot 116 such that the cylindrical shank 118*b* is inserted into the selected recess 140 and the head 118*a* is inserted into the slot 116. The shoulder pins 118 prevent rotation of the sleeve 130 and lens cell 150 relative to the housing 110, and also restrict longitudinal translation of the sleeve 130 with respect to the housing 110 since the shoulder pins 118 are limited in translation to the length of the slots 116. In the event that the recesses 140 and the slot 116 do not perfectly align to retain perfect collimation, the sleeve 130 may be indexed relative to the housing 110 to obtain alignment between the recesses 140 and the slots 116, while only slightly distorting the collimation of the eyepiece 106. Once the optical axis 158 is collimated, the lock ring 148 is threaded onto the sleeve 130 to secure the lens cell 150 against the sleeve 130.

The focus ring 170 is next threaded onto the housing 110. The snap ring 184 is snapped into the groove 143 and secures the lip 182 of the focus ring 170 against the lip 142 of the sleeve 130 so that translation of the focus ring 170 caused by the threaded connection of the focus ring 170 with the housing 110 is transferred to the sleeve 130 and the lens cell 150 without rotation of the sleeve 130 or the lens cell 150.

The monocular 100 may be part of a helmet-mounted or handheld night vision system. Alternatively, the monocular 100 may be used as a sight for a weapon system, such as a rifle or even a tank. Further, the monocular 100 may be incorporated into any optical system requiring focusing and collimation.

Referring back to FIG. 1, a second monocular 200 is used in conjunction with the monocular 100 to form the binocular 210. The second monocular 200 is preferably structurally similar to the monocular 100. The first and second monoculars 100, 200 are releasably connected to a binocular frame 212 through the power connector 194 on each monocular 100, 200. In the event that one of the monoculars 100, 200 needs to be repaired or replaced, that monocular is removed from the frame 212 and repaired or replaced. When the repaired or replacement monocular is connected to the binocular frame 212, the repaired or replaced monocular does not need to be collimated with the original monocular.

Although the invention is illustrated and described herein with reference to a specific embodiment, the invention is not intended to be limited to the details shown. Rather, various modifications may be made in the details within the scope and range of equivalents of the claims and without departing from the invention. While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An optical system comprising:
a lens cell having a generally cylindrical lens cell body and an optical lens system therein, wherein the lens cell body has a lens cell central longitudinal axis and a lens cell optical axis, eccentrically offset from the lens cell central longitudinal axis;
a sleeve having a generally cylindrical sleeve body, wherein the sleeve body has an outer surface with a first longitudinal axis and an inner surface with a second longitudinal axis, eccentrically offset from the first longitudinal axis, wherein the lens cell is inserted into the sleeve; and
a housing having a generally cylindrical body, wherein the sleeve is at least partially inserted into the housing,
wherein the lens cell and the sleeve are rotated relative to each other and to the housing such that the lens cell optical axis is aligned in a desired location, wherein, after the lens cell optical axis is aligned in the desired location, the lens cell is fixedly connected to the sleeve and the sleeve is connected to the housing to prevent rotation of the sleeve relative to the housing, and wherein the sleeve remains longitudinally translatable relative to the housing after the sleeve is connected to the housing to prevent rotation.

2. The optical system according to claim 1, wherein the lens cell body comprises a plurality of locking members and wherein the sleeve body comprises a plurality of mating members engaged with the plurality of locking members to prevent rotation of the lens cell relative to the sleeve.

3. The optical system according to claim 1, wherein the outer surface of the sleeve body comprises a plurality of recesses circumferentially spaced therearound and wherein the optical system further comprises at least one locking member extending through the housing and into one of the plurality of recesses to connect the housing and the sleeve together.

4. The optical system according to claim 3, wherein the housing comprises at least one elongated opening therein, and wherein each of the at least one locking member extends through a complementary one of the at least one elongated opening.

5. The optical system according to claim 4, wherein the plurality of recesses may be indexed relative to the at least one elongated opening.

6. The optical system according to claim 1, further comprising a focus ring threadably connected to the housing.

7. A monocular comprising:
the optical system of claim 1;
a lens assembly; and
an image intensifier disposed between the lens assembly and the eyepiece.

8. A method of manufacturing a collimated optical device comprising the steps of:
providing a lens cell having a generally cylindrical lens cell body, wherein the lens cell body has a lens cell central longitudinal axis and a lens cell optical axis, offset from the lens cell central longitudinal axis;
inserting the lens cell into a sleeve, wherein the sleeve comprises a generally cylindrical sleeve body, wherein the sleeve body has an outer surface with a first longitudinal axis and an inner surface with a second longitudinal axis offset from the first longitudinal axis;
inserting the sleeve at least partially into a housing, wherein the housing comprises a generally cylindrical housing body;
independently rotating the sleeve and the lens cell relative to the housing until the lens cell optical axis is at a desired location;
securing the sleeve and the lens cell to each other to prevent rotation of the sleeve relative to the lens cell; and
securing the sleeve to the housing to prevent rotation of the sleeve relative to the housing, wherein securing the sleeve to the housing includes longitudinally translating the sleeve with respect to the housing.

9. The method according to claim 8, wherein the lens cell body comprises a plurality of locking members and wherein the sleeve body comprises a plurality of mating members, wherein securing the sleeve and the lens cell to each other further comprises engaging the plurality of locking members with the plurality of mating members to prevent rotation of the lens cell relative to the sleeve.

10. The method according to claim 8, wherein securing the sleeve to the housing comprises inserting a pin through the housing and engaging the sleeve.

11. The method according to claim 8, further comprising threadably connecting a focus ring to the housing.

* * * * *